(12) United States Patent
Ansari et al.

(10) Patent No.: US 7,269,805 B1
(45) Date of Patent: Sep. 11, 2007

(54) TESTING OF AN INTEGRATED CIRCUIT HAVING AN EMBEDDED PROCESSOR

(75) Inventors: Ahmad R. Ansari, San Jose, CA (US);
Mehul R. Vashi, San Jose, CA (US);
Nigel G. Herron, San Jose, CA (US);
Stephen M. Douglass, Saratoga, CA (US)

(73) Assignee: Xilinx, Inc., San Jose, CA (US)

( * ) Notice: Subject to any disclaimer, the term of this patent is extended or adjusted under 35 U.S.C. 154(b) by 579 days.

(21) Appl. No.: 10/836,995

(22) Filed: Apr. 30, 2004

(51) Int. Cl.
*G06F 17/50* (2006.01)
*G06F 9/45* (2006.01)

(52) U.S. Cl. .................. 716/4; 716/5; 716/6; 716/17
(58) Field of Classification Search .............. 716/4–6, 716/17
See application file for complete search history.

(56) References Cited

U.S. PATENT DOCUMENTS

| | | | |
|---|---|---|---|
| 3,761,695 | A | 9/1973 | Eichelberger |
| 4,687,988 | A | 8/1987 | Eichelberger et al. |
| 4,880,754 | A | 11/1989 | Correale |
| 5,307,478 | A | 4/1994 | Rasbold et al. |
| 5,719,783 | A | 2/1998 | Kerzman et al. |
| 5,724,250 | A | 3/1998 | Kerzman et al. |
| 5,748,497 | A | 5/1998 | Scott et al. |
| 5,761,515 | A | 6/1998 | Barton, III et al. |
| 5,819,072 | A | 10/1998 | Bushard et al. |
| 5,923,564 | A | 7/1999 | Jones, Jr. |
| 5,963,566 | A | 10/1999 | Rajsuman et al. |
| 5,968,192 | A * | 10/1999 | Kornachuk et al. ......... 714/724 |
| 6,059,451 | A | 5/2000 | Scott et al. |
| 6,163,875 | A | 12/2000 | Suzuki |
| 6,185,714 | B1 | 2/2001 | Satoh |
| 6,212,666 | B1 | 4/2001 | Gohl et al. |
| 6,249,893 | B1 | 6/2001 | Rajsuman et al. |
| 6,314,540 | B1 | 11/2001 | Huott et al. |
| 6,363,520 | B1 | 3/2002 | Boubezari et al. |
| 6,408,412 | B1 | 6/2002 | Rajsuman |
| 6,415,403 | B1 | 7/2002 | Huang et al. |
| 6,424,583 | B1 | 7/2002 | Sung et al. |
| 6,513,103 | B1 | 1/2003 | Garlepp et al. |
| 6,532,571 | B1 | 3/2003 | Gabrielson et al. |
| 6,609,228 | B1 | 8/2003 | Bergeron et al. |
| 6,658,506 | B1 | 12/2003 | Nassif et al. |

(Continued)

OTHER PUBLICATIONS

U.S. Appl. No. 09/991,412, filed Nov. 16, 2001, Herron et al.

(Continued)

*Primary Examiner*—Thuan Do
*Assistant Examiner*—Magid Y. Dimyan
(74) *Attorney, Agent, or Firm*—W. Eric Wobostad

(57) ABSTRACT

Method and apparatus for generating a test program for an integrated circuit having an embedded processor. One embodiment has a system which includes an embedded microprocessor; a plurality of assembly language instructions stored in a memory, where the assembly language instructions substantially exercise a critical path or a path closest to the critical path in the embedded microprocessor; and programmable test circuitry having a programmable clock circuit for providing a multiplied clock signal to the embedded microprocessor in order to execute the assembly language instructions.

9 Claims, 8 Drawing Sheets

U.S. PATENT DOCUMENTS

| | | | |
|---|---|---|---|
| 6,658,610 | B1 | 12/2003 | Chai et al. |
| 6,658,633 | B2 | 12/2003 | Devins et al. |
| 7,017,094 | B2 * | 3/2006 | Correale et al. ............ 714/733 |
| 2002/0075740 | A1 | 6/2002 | Sung et al. |
| 2003/0167144 | A1 | 9/2003 | Wang et al. |
| 2003/0177455 | A1 | 9/2003 | Kaufman et al. |
| 2004/0025129 | A1 | 2/2004 | Batchelor |
| 2004/0061541 | A1 | 4/2004 | Correale et al. |
| 2004/0062360 | A1 | 4/2004 | Holeva |
| 2004/0064771 | A1 | 4/2004 | Appinger et al. |
| 2004/0064794 | A1 | 4/2004 | Yang |
| 2004/0216061 | A1 * | 10/2004 | Floyd et al. .................... 716/4 |
| 2004/0230395 | A1 * | 11/2004 | Basto .......................... 702/117 |

OTHER PUBLICATIONS

U.S. Appl. No. 10/084,515, filed Feb. 27, 2002, Burnley.
U.S. Appl. No. 10/086,130, filed Feb. 28, 2002, Fang.
U.S. Appl. No. 10/241,496, filed Sep. 10, 2002, Burnley et al.
U.S. Appl. No. 10/777,327, filed Feb. 12, 2004, Thorne et al.
U.S. Appl. No. 10/837,395, filed Apr. 30, 2004, Herron et al.
Xilinx, Inc.; "Virtex-II Pro X Platform FPGAs: Functional Description"; DS110-2 (v1.1); Advance Product Specification; Mar. 5, 2004; available from Xilinx, Inc., 2100 Logic Drive, San Jose, California 95124; pp. 1-51.
Xilinx, Inc.; "Processor Local Bus (PLB) Arbiter Design Specification"; Virtex-II Pro IP Handbook; Feb. 27, 2002; available from Xilinx, Inc., 2100 Logic Drive, San Jose, California 95124; pp. 35-70.
Xilinx, Inc.; "PLB Block RAM (BRAM) Interface Controller"; DS420 (v1.2); Product Specification; Nov. 11, 2002; available from Xilinx, Inc., 2100 Logic Drive, San Jose, California 95124; pp. 525-534.
Marion G. Harman et al.; "A Retargetable Technique for Predicting Execution Time of Code Segments"; This work was supported in part by grants from the U.S. Office of Naval Research; pp. 1-30.
Jay Lawrence; "Orthogonality of Verilog Data Types and Object Kinds"; Cadence Design Systems; Copublished by the IEEE CS and the IEEE CASS; IEEE Design and Test of Computers; Copyright 2003 IEEE; pp. 94-96.
Interview; "ARM Twisting with Sir Robin, An Interview with ARM Chairman Sir Robin Saxby"; Copyright 2003 IEEE; Copublished by the IEEE CS and the IEEE CASS; IEEE Design and Test of Computers; pp. 90-93.
Peter C. Maxwell; "Wafer-Package Test Mix for Optimal Defect Detection and Test Time Savings"; Agilent Technologies; Copyright 2003; Copublished by the IEEE CS and the IEEE CASS; IEEE Design and Test of Computers; pp. 84-89.

Bill Eklow (Cisco Systems), Carl Barnhart (Cadence), Kenneth P. Parker (Agilent Technologies); "IEEE 1149.6: A Boundary-Scan Standard for Advanced Digital Networks"; Copyright 2003; Copublished by the IEEE CS and the IEEE CASS; IEEE Design and Test of Computers; pp. 76-83.
Darren Anand et al.; "An On-Chip Self-Repair Calculation and Fusing Methodology"; Copyright 2003; Copublished by the IEEE CS and the IEEE CASS; IEEE Design and Test of Computers; pp. 67-75.
Janusz Rajski et al.; "Embedded Deterministic Test for Low-Cost Manufacturing"; Copyright 2003; Copublished by the IEEE CS and the IEEE CASS; IEEE Design and Test of Computers; pp. 58-66.
Robert Madge et al.; "Obtaining High Defect Coverage for Frequency-Dependent Defects in Complex ASICs"; Copyright 2003; Copublished by the IEEE CS and the IEEE CASS; IEEE Design and Test of Computers; pp. 46-53.
Bruce D. Cory et al.; "Speed Binning with Path Delay Test in 150-nm Technology"; Copyright 2003; Copublished by the IEEE CS and the IEEE CASS; IEEE Design and Test of Computers; pp. 41-45.
Alfred L. Crouch et al.; "AC Scan Path Selection for Physical Debugging"; Copyright 2003; Copublished by the IEEE CS and the IEEE CASS; IEEE Design and Test of Computers; pp. 34-40.
Stephen Pateras; "Achieving At-Speed Structural Test"; Copyright 2003; Copublished by the IEEE CS and the IEEE CASS; IEEE Design and Test of Computers; pp. 26-33.
Xijiang Lin et al.; "High-Frequency, At-Speed Scan Testing"; Copyright 2003; Copublished by the IEEE CS and the IEEE CASS; IEEE Design and Test of Computers; pp. 17-25.
Kee Sup Kim et al.; "Delay Defect Characteristics and Testing Strategies"; Copyright 2003; Copublished by the IEEE CS and the IEEE CASS; IEEE Design and Test of Computers; pp. 8-16.
Kenneth M. Butler et al.; "Guest.Editors' Introduction: Speed Test and Speed Binning for Complex ICs"; Copyright 2003; Copublished by the IEEE CS and the IEEE CASS; IEEE Design and Test of Computers; pp. 6-7.
Xilinx, Inc.; "Virtex-II Pro X Platform FPGAs: Complete Data Sheet"; DS110 (v1.1); Advance Product Specification; Mar. 5, 2004; available from Xilinx, Inc., 2100 Logic Drive, San Jose, California, 95124; pp. 185.
Xilinx, Inc.; "PowerPC Processor Reference Guide, Embedded Development Kit"; EDK 6.1 Sep. 2, 2003; available from Xilinx, Inc., 2100 Logic Drive, San Jose, California, 95124; pp. 1-570.
Xilinx, Inc.; "PowerPC 405 Processor Block Reference Guide, Embedded Development Kit"; EDK 6.1 Oct. 6, 2003; available from Xilinx, Inc., 2100 Logic Drive, San Jose, California, 95124; pp. 1-176.

* cited by examiner

US 7,269,805 B1

TESTING OF AN INTEGRATED CIRCUIT HAVING AN EMBEDDED PROCESSOR

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

One or more aspects of the invention relate generally to testing of an integrated circuit (IC) having an embedded processor.

BACKGROUND OF THE INVENTION

Conventionally, testing of integrated circuits involves placing the microchip under test on a device under test ("DUT") card connected to a tester. The tester is used to test the integrated circuit for functionality. In instances where the tester is sufficiently fast, the integrated circuit may be tested at a maximum frequency of operation.

Integrated circuits which are more or less standard products are often speed binned. Examples of such standard products include memories, processors and programmable logic devices, among others. One form of programmable logic device which is a standard product is a Field Programmable Gate Array ("FPGA").

Speed binning an integrated circuit involves testing to determine a frequency, such as the maximum frequency of operation of the integrated circuit, for which it continues to function correctly. Accordingly, some integrated circuits will operate at faster speeds than other same or similarly manufactured integrated circuits whether from same or different production lots. Conventionally, speed binning is used to identify parts that can operate at frequencies in excess of a baseline frequency for sale at a premium price.

Additionally, integrated circuits are tested for functionality. A host integrated circuit with an embedded processor block may include an embedded processor and interface circuitry for interfacing the embedded processor with circuitry of the host integrated circuit. This interface circuitry may operate at the same frequency of operation as the embedded processor. Examples of such interface circuitry include on-Chip Memory (OCM) controllers as found in the Virtex-II Pro FPGA from Xilinx Corp. of San Jose, Calif. To test such interface circuitry for functionality, such interface circuitry should be run at the frequency of operation of the embedded processor.

However, testers have certain limitations. For example, testers have problems testing integrated circuits having an embedded processor block with a frequency of operation significantly faster than a host integrated circuit in which the embedded processor block is embedded. Another limitation of testers is being able to control, from externally accessible pins of the host integrated circuit, internal pins of the embedded processor block, especially when such internal pins significantly out number the externally accessible pins. Limitations of access to internal pins impedes functional testing of an embedded processor block, including testing interface circuitry thereof.

Accordingly, it would be desirable and useful to provide a better means for performance testing, including speed and functional testing, an embedded processor block in an integrated circuit device.

SUMMARY OF THE INVENTION

Aspects of the invention generally relate to testing of an integrated circuit having an embedded processor. An exemplary embodiment includes a system for categorizing (for example, speed binning or functional pass/fail) an integrated circuit having an embedded processor. The system includes: means for transferring a set of assembly language instructions to means for storage of the embedded processor at a first clock rate; means for executing a critical path or near critical path of the embedded processor by using the set of assembly language instructions where the means for executing occurs at a second clock rate; and means for obtaining a test result responsive to running the set of assembly language instructions in order to categorize the integrated circuit.

One embodiment of the present invention includes a system for testing an integrated circuit. The system includes: an embedded microprocessor; a plurality of assembly language instructions stored in a memory, where the assembly language instructions substantially exercise a critical path or a path close or closest to the critical path in the embedded microprocessor; and programmable test circuitry having a programmable clock circuit for providing a multiplied clock signal to the embedded microprocessor in order to execute the assembly language instructions.

An aspect of the present invention includes a system for speed binning an integrated circuit having an embedded processor. The system includes: means for transferring a set of assembly language instructions to a means for storage of the embedded processor at a first clock rate; means for executing a critical path or near critical path of the embedded processor by using the set of assembly language instructions by the embedded processor where the means for executing occurs at a second clock rate in order to exercise a critical path thereof; and means for obtaining a test result responsive to running the set of assembly language instructions in order to speed bin the integrated circuit.

Another aspect of the present invention includes a system for testing a portion of a processor block embedded in a programmable logic device, the system comprising: means for configuring configurable programmable logic of the programmable logic device for forming a test bench; means for providing a clock signal to the test bench; and means for initiating a test of the portion of the processor block.

Another embodiment of the present invention includes a programmable logic device, having: configured self-test circuitry, where the configured self-test circuitry is formed from the configurable logic of the programmable logic device, and includes a bus arbiter, a memory controller, an address decoder, and a reset circuit; the reset circuit configured to receive a reset signal and a lock signal, where the reset circuit provides a processor reset signal to an embedded processor responsive to the lock signal indicating a lock condition; and the bus arbiter, the memory controller, and the address decoder coupled to the embedded processor.

Yet another aspect of the present invention includes a system for functionally testing a circuit on an integrated circuit. The system includes: a processor block embedded in the integrated circuit and having a plurality of assembly language instructions, where the plurality of assembly language instructions functionally tests the circuit; and programmable test circuitry having a programmable clock circuit, receiving a system clock and generating a multiplied clock signal that is provided to the processor block in order to execute the plurality of assembly language instructions.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

An FPGA is an example of an integrated circuit that may be used for implementing one or more aspects of the invention. However, programmable logic devices ("PLDs") other than FPGAs, including complex PLDs ("CPLD") and the like may be used for implementing one or more aspects of the invention. Additionally, other integrated circuits, such as an Application Specific Integrated Circuit ("ASIC"), Application Specific Standard Product ("ASSP"), processors, and the like may have one or more aspects of the invention implemented therein.

Moreover, more than one, including a combination of same or different devices, may be embedded in a host integrated circuit. Accordingly, it should be appreciated that any system on a chip ("SoC"), namely, a host integrated circuit having an embedded processor, may be tested as described herein.

Furthermore, though integrated circuit configurable cells are described for providing circuitry for implementing one or more aspects of the invention, it should be appreciated that dedicated circuitry may be used. Notably, there are many possible exemplary embodiments, and thus for purposes of clarity, what follows is described in terms of a general purpose microprocessor embedded in a host FPGA.

Field Programmable Gate Array

Figure 1:
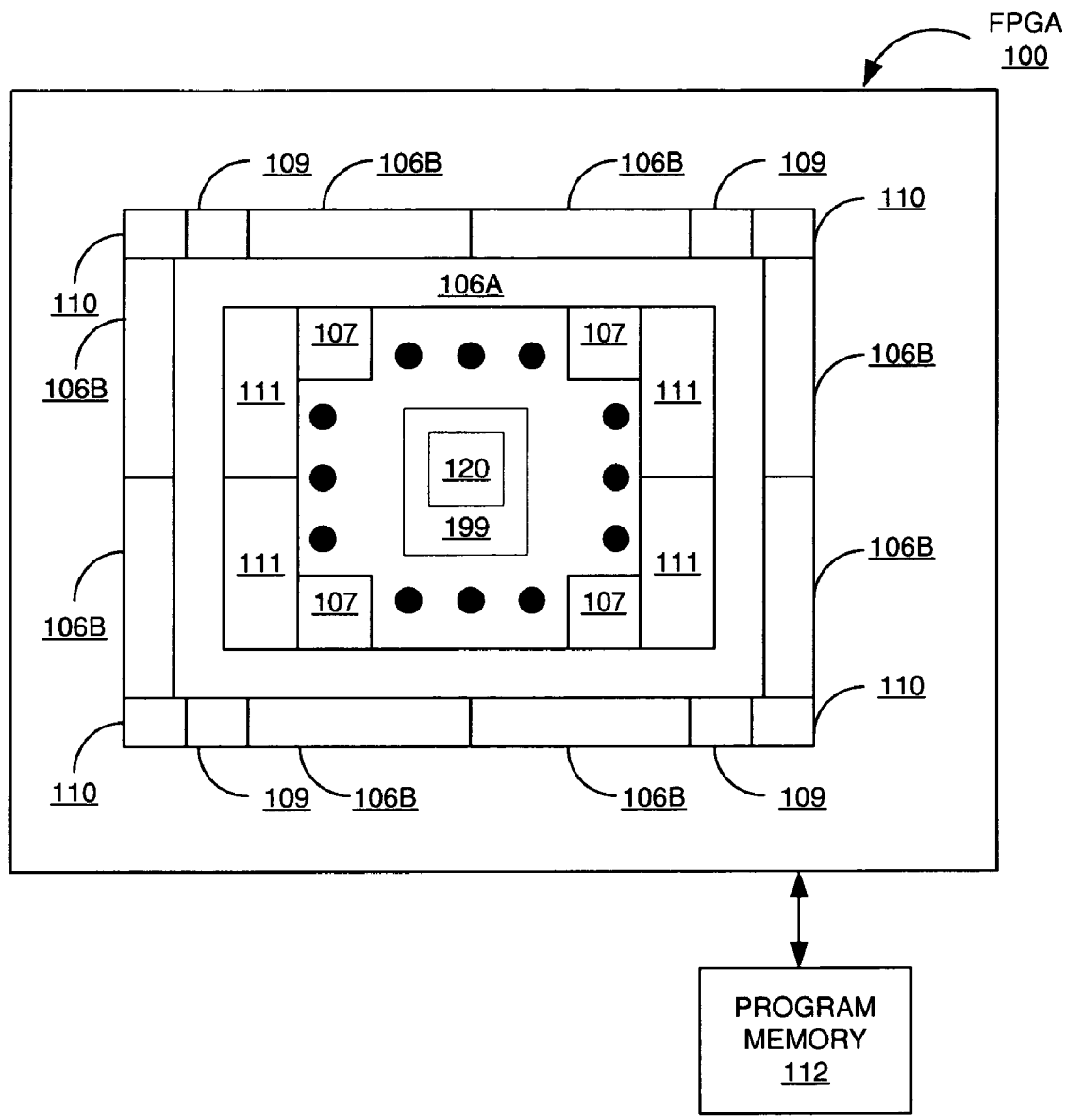
FIG. 1 is a high-level block diagram depicting an exemplary embodiment of an FPGA.

FIG. 1 is a high-level block diagram depicting an exemplary embodiment of an FPGA 100. FPGA 100 includes configurable logic blocks ("CLBs") 107, I/O routing ring 106A, memory, such as random access memory ("RAM") 111, delay lock loops ("DLLs") 109, multiply/divide/de-skew clock circuits 110, and programmable input/output blocks ("IOBs") 106B. IOBs 106B may include transceivers, such as multi-gigabit transceivers ("MGTs"). DLLs 109 and clock circuits 110 collectively provide digital clock modules or managers ("DCMs"). Notably, though DLLs are used, it should be appreciated that phase-locked loops ("PLLs"), as well as other known clock generation circuits, may be used.

External memory 112 may be coupled to FPGA 100 to store and provide a configuration bitstream to configure FPGA 100, namely, to program one or more memory cells to configure CLBs 107 and IOBs 106B. FPGA 100 includes an embedded processor 120. Notably, FPGA 100 may include more than one embedded processor 120. Embedded processor 120 is part of processor block 199. To interface embedded processor 120 with FPGA circuitry ("fabric"), processor interface circuitry of processor block 199 may be used, as described below in additional detail.

Though an input/output ring architecture is illustratively shown for FPGA 100, it should be understood that other architectures for FPGA 100, such as a columnar architecture, may be used. Moreover, aspects of the invention are not limited to any particular input/output architecture.

Test System

Figure 2:
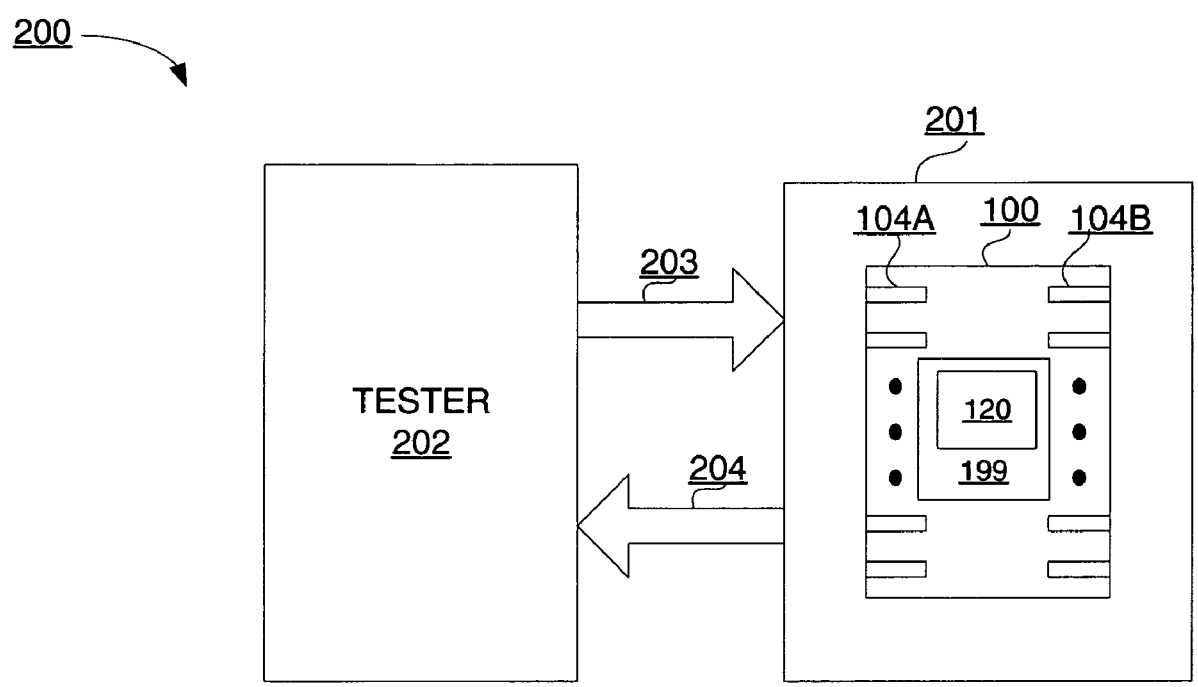
FIG. 2 is a block diagram depicting an exemplary embodiment of a test system.

FIG. 2 is a block diagram depicting an exemplary embodiment of a test system 200. With continuing reference to FIG. 2 and renewed reference to FIG. 1, test system 200 is described.

Test system 200 includes tester 202 and DUT card 201. Test signals 203 are provided to DUT card 201 for pins 104A of FPGA 100. In response to test signals 203, FPGA 100 provides test signals 204 to DUT card 201 via pins 104B of FPGA 100. Notably, an embedded processor 120 may have more input/output ("I/O") pins than the packaged FPGA 100 in which it is embedded, and FPGA 100 may have more I/O pins than tester 202.

FPGA 100 may have a higher frequency of operation than tester 202, and embedded processor 120 may operate a higher frequency of operation than FPGA 100. Thus, integrated circuit 100 may have at least two clock domains, namely, one for FPGA 100 exclusive of embedded processor 120 and one for embedded processor 120. Notably, at least a portion of processor block 199 of FIG. 1 may operate at the same frequency of operation as embedded processor 120.

For speed testing of FPGA 100, it should be understood that a "testbench" includes code written for configuring an FPGA with self-test circuitry from configurable logic. A test routine includes determined assembly language coded instructions for exercising a particular path of an embedded processor. Included as part of the test routine is wrapper code, which facilitates executing the determined instructions by an embedded processor.

Notably, by having a testbench for instantiating self-test circuitry, such testbench need not be specific to one programmable logic device platform. Accordingly, such testbench may be used among several programmable logic device platforms. Moreover, assembly language instructions may be used among several embedded processor platforms. Accordingly, it should be appreciated that a test program as described herein may be portable among a plurality of host integrated circuit platforms. Additionally, because configurable logic may be used to instantiate self-test circuitry, which after testing may be returned to a pool of usable resources, dedicated BIST circuitry may be reduced or avoided.

Operating frequency of an integrated circuit varies with process, voltage and temperature. Thus, it will be appreciated that means described herein may be used for verification of speed of operation, including, but not limited to, maximum speed or above some threshold speed of operation, whether in a standalone environment, connected to a tester (such as automatic test equipment ("ATE")), or undergoing environmental stress testing, or a combination thereof.

Furthermore, it will be appreciated that integrated circuit internal interconnects may be used. If there are differences in I/O pins, namely, where an embedded device has significantly more I/O pins than the device in which it is embedded, then using internal interconnects for testing avoids limitations associated with pin count disparity. For example, embedded processor signals, not otherwise accessible from outside of the SoC, may be controlled or observed using integrated circuit internal interconnects for subsequent output of information indicating performance level test results, such as when operating at a frequency of operation.

Furthermore, ATE may have fewer pin connections than the host integrated circuit, so self-test may be used to simplify the interface between the ATE and the host integrated circuit. Moreover, it will be appreciated that performance may be determined by the integrated circuit ("on-chip") in contrast to having integrated circuit performance determined by an external device ("off-chip"), such as by a tester, where other intervening factors may influence outcome.

Tester 202 provides a source clock signal to FPGA 100, a configuration bitstream to FPGA 100 for instantiating test circuitry, and monitors pass, fail and interrupt signals from such test circuitry, as described below in additional detail. Moreover, tester 202 may be coupled to a microchip handler (not shown) for placing tested FPGAs 100 into respective bins according to speed test results ("speed binning"). In should be understood, that after an FPGA 100 is binned, power is removed from the FPGA. Accordingly, any instantiated circuitry through powered configurable logic is no longer present. This is in contrast to dedicated test circuitry which remains with an integrated circuit. Furthermore, in contrast to conventional built-in self test circuitry, configured-in self test circuitry as described herein may be present only for one or more particular tests being run, and may not be present for all tests. Moreover, in contrast to conventional built-in self test circuitry, which powers up with user usage, configured-in self-test circuitry may not be present for user usage.

Notably, it should be appreciated that FPGA 100 may be loaded with a configuration bitstream, provided a clock signal and power, and monitored for pass, fail or interrupt. Furthermore, it should be understood that tests other than speed verification, such as functional tests, may be done.

Speed Verification

Figure 3:
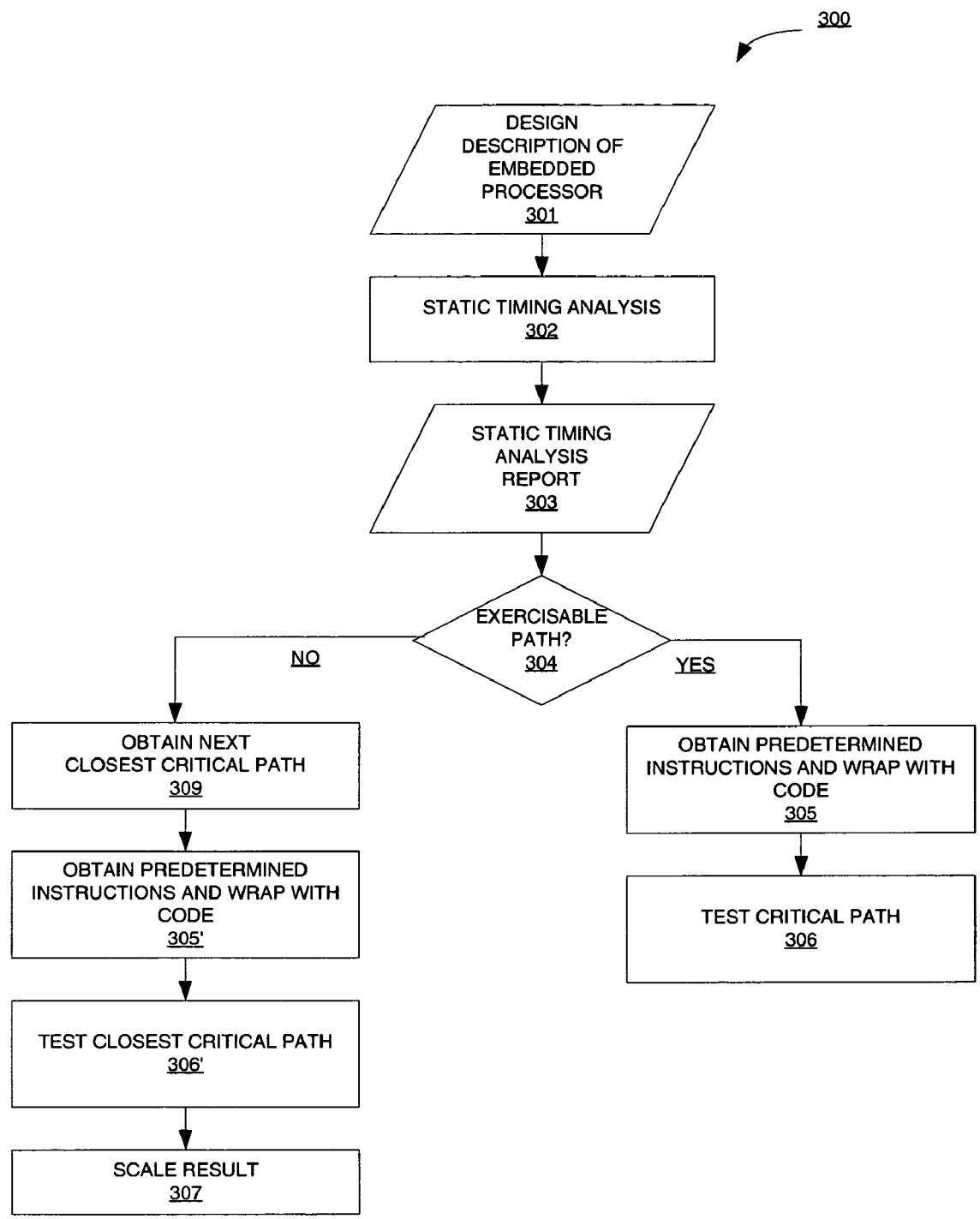
FIG. 3 is a flow diagram depicting an exemplary embodiment of a speed verification flow.

FIG. 3 is a flow diagram depicting an exemplary embodiment of a speed verification flow 300. A design description of an embedded processor ("design description") 301 is obtained. Design description 301 may be in any of a variety of known circuitry simulation languages, conventionally such as gate-level description or Register Transfer Level ("RTL") converted from a Very High Speed Integrated Circuits (VHSIC) Hardware Description Language ("VHDL"), Verilog, C language for hardware description, or the like hardware description language.

Accordingly, the design description may be a netlist, or more particularly a back-annotated netlist. The format of design description 301 is dependent on acceptable input formats to a static timing analysis tool used to perform a static timing analysis at 302. Static timing analysis tools are well known, and thus are not described in detail herein.

Output of static timing analysis at 302 is a static timing analysis report 303. In static timing analysis report 303, at least one "speed limiting path" is reported. A "speed limiting path" includes a path that limits frequency of operation. In other words, a "speed limiting path" is a signal path where propagation delay of a signal traveling thereon imposes an upper limit on frequency of operation for that path. Conventionally, a speed limiting path is the longest path along which a clock-dependent signal travels. The speed limiting path or paths imposing the greatest impact on frequency of operation of an integrated circuit are conventionally referred to as the "critical" path or paths, respectively.

At step 304, it is determined whether an identified critical path can be exercised by predetermined assembly language coded instructions. If at 304, an identified critical path cannot be exercised by predetermined assembly language coded instructions running on an embedded microprocessor, a next closest critical path is obtained (step 309). The next closest critical path obtained is checked to determine if it can be exercised by predetermined assembly language coded instructions. These predetermined instructions are assembly language instructions, which may be run by embedded processor 120. Examples of such instructions may be found in: "PowerPC Processor Reference Guide: Embedded Development Kit" (EDK 6.1 Sep. 2, 2003) [online] Xilinx, Inc. 2003. Retrieved from the Internet: <URL:http://www.xilinx.com/bvdocs/userguides/ppc_ref_guide. pdf>.

In one embodiment of the present invention the set of assembly instructions to exercise the critical path of the embedded processor 120 is provided by the processor manufacturer. An example set of instructions provided by IBM, Inc. of White Plains, N.Y. for testing the critical path in their PowerPC Processor are provided in Appendices A and B, which are herein incorporated by reference. In Appendix A, there is shown a sample of an embodiment of system initialization code for the PowerPC processor. In Appendix B, there is shown a sample of an embodiment of data side speed binning test code for the PowerPC processor. This test uses operand forwarding and thus is named "operandFwd". The operandFwd test is a critical path test of a data side of embedded processor 120, which starts from a data cache array 405 and ends with data in an operand register of embedded processor 120.

While using predetermined assembly instructions from the manufacturer is more convenient, it is not necessary. For example, if the embedded processor is simpler (when compared to the PowertPC), determining the set of assembly instructions exercising or stimulating the processor's critical path would not take undue experimentation. For example, if the softcore PicoBlaze Microcontroller from Xilinx, Inc. of San Jose, Calif. (described in PicoBlaze 8-Bit Microcontroller for Virtex-II Series Devices XAPP627 (v1.1) Feb. 4, 2003, which is incorporated by reference, herein) were hardwired in as an embedded processor 120, one of ordinary skill in the art could determine the set of assembly instructions exercising the processor's critical path or near critical path without undue experimentation.

Hence in another embodiment the assembly instructions to exercise the critical path of the embedded processor 120 are determined by analyzing the design schematics and the static timing report of the microprocessor. Further the back-annotated hardware description language (HDL) netlist may be used to determine and test that the selected set assembly instructions exercising the critical path or near critical path of the embedded processor. The selected set assembly instructions then can be verified on the actual embedded processor.

These assembly language determined instructions are wrapped in wrapper code at 305. Wrapper code may be used to cause assembly language determined instructions for exercising a path, such as a critical path, to be loaded into an embedded processor. Part of the wrapper code identifies where, such as by one or more memory addresses, to obtain such assembly language determined instructions, and to write the assembly language determined instructions obtained at the address into cache memory of the embedded processor. Assembly language determined instructions and wrapper code may be initially written to FPGA internal memory at specified locations during initial configuration of an FPGA, including configuring an FPGA with self-test circuitry. Alternatively, external memory may be used to store such assembly language determined instructions, in which implementation an external address may be specified for obtaining such determined instructions.

At step 306 the critical path of the embedded processor 120 is tested. In order to determine the critical path through the processor block 199, other processor block elements such as the OCM controllers (see refs. 461 and 462 in FIG. 4) must be evaluated. For example, the OCM controllers in the Virtex-II Pro FPGA of Xilinx Corp. provide quick access to adjacent BRAMs. In this example, the critical path times using the OCM controllers is substantially smaller than the critical path time through the processor, hence in this case the critical path time through the embedded processor 120 is used to determine the critical path time through the processor block 199 and thus the speed bin (see FIG. 5) of the FPGA. However, in other embodiments the critical path time through the processor block 199 must include both the embedded processor critical path time and the critical path times through the other elements of the processor block such as the OCM controllers.

Returning to FIG. 3, at 309, if it is very difficult or not practical or not possible to identify the first set of assembly instructions to exercise the critical path then a second set of assembly instructions to exercise a next closest critical path or substantially close path to the critical path is identified and the result scaled to give the critical path time. At step 305' the second set of assembly instructions has wrapper code added to it similar to step 305. At step 306' the next closest critical path is tested like step 306.

At step 307, a frequency of operation for a pass result obtained at 306' may be scaled. This scaling may be done for example by multiplying the obtained frequency of operation by a ratio of the worst case delay (or critical path time) reported in the static timing analysis and the delay result obtained for the path exercised. However, other implementations for scale may be done. For example, a maximum frequency of operation for a salable part may be divided by a minimum frequency of operation for the salable part to provide max/min frequency ratio. The frequency of operation at which the part passes may be multiplied by the max/min frequency ratio to obtain the frequency of operation of the part.

Figure 6:
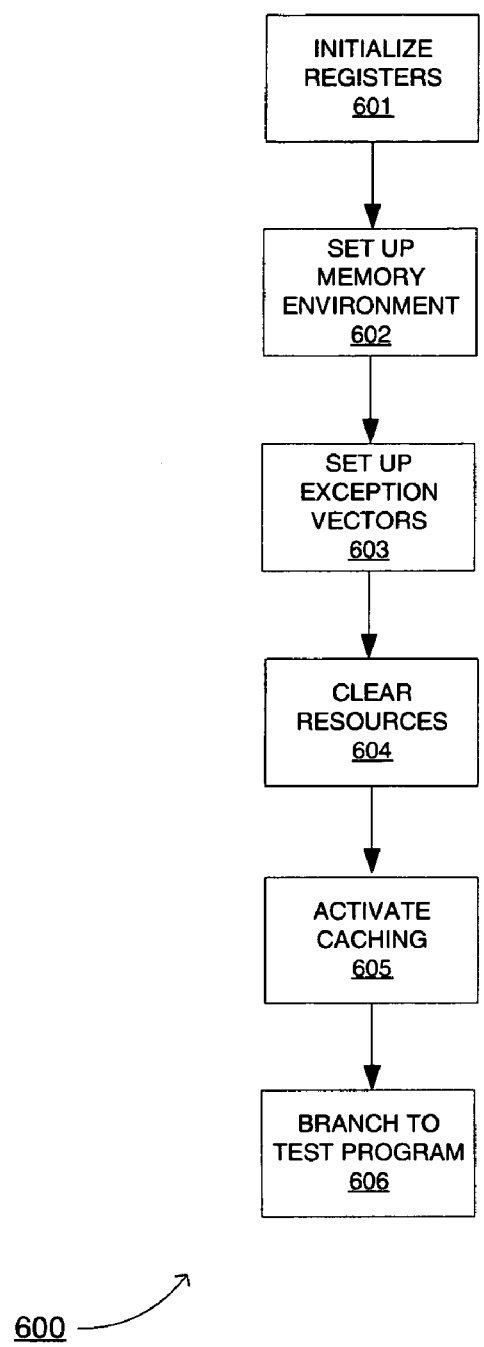
FIG. 6 is a flow diagram for an exemplary embodiment of a processor initialization flow.

FIG. 6 is a flow diagram for an exemplary embodiment of a processor initialization flow 600. Initialization flow 600 is part of wrapper code added at 305 of FIG. 3. Initialization flow 600 sets an embedded processor 120 to a known state in preparation for one or more test programs or routines.

At 601, registers of embedded processor 120 are initialized. At 602, the memory environment is set up. At 603, exception vectors are set up. Exception vectors are initialized with branches to exception handlers. This may include setting an address for an exception vector prefix register.

At 604, embedded processor 120 resources are cleared, such as clearing general purpose registers, fix point exception registers and reservation bit(s). At 605, data and instruction caches are activated. At 606, initialization flow 600 branches ("jumps") to a test program or routine, such as a set of determined assembly language instructions for exercising a critical path.

Returning to FIG. 3, after 305, a critical path is tested at 306. In a network, there may be multiple paths. Though more than one speed limiting path may be exercised at a time, for purposes of clarity, it will be assumed that only one speed limiting path is being exercised at a time, as it will be readily apparent that more than one speed limiting path may be exercised at a time.

Figure 7:
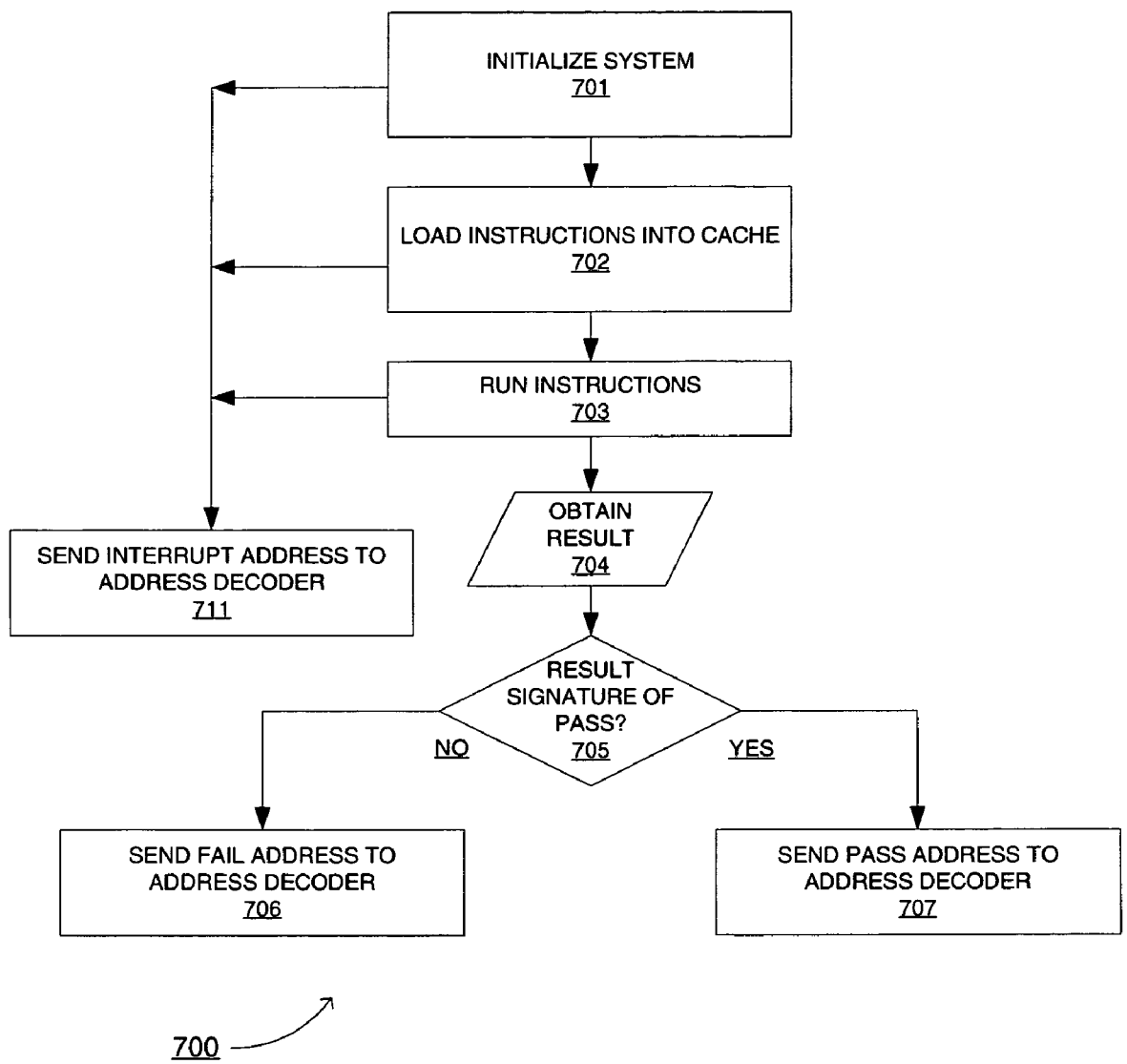
FIG. 7 is a flow diagram depicting an exemplary embodiment of a test sequence for testing a critical path of an embedded processor block.

FIG. 7 is a flow diagram depicting an exemplary embodiment of a test sequence 700 for testing a critical path of an embedded processor. At the completion of initialization flow 600, an embedded processor block 199 has been initialized at 701 and initialization flow 600 branches to a test program or routine, which is loaded at 702.

At 702, determined assembly language coded instructions are loaded into cache of an embedded processor. Notably, by loading all instructions into cache first, cache misses are avoided. Testing a critical path with a cache miss may invalidate the test.

At 703, such instructions loaded into cache are executed by the embedded processor to exercise an identified critical path within the embedded processor. To know whether a test has run to completion, there is a time limit to execute a set of instructions within one or more clock cycles of a frequency of operation of the embedded processor while executing on a critical path thereof. At the conclusion of the test, i.e., after the time limit is reached, there will be either a pass signature, a fail signature or an interrupt signature. The tester will check which signature has been generated at the conclusion of the test.

For example, a value, such as 5, may be loaded into a register associated with the critical path. Immediately following a load instruction, may be an add instruction, for example, to add 5 to the value of 5 stored in the register. At 704, a result for instructions run at 703 is obtained. At 705, a check is made to determine if the result obtained at 704 is a signature or otherwise indicates a pass of the test. Continuing the above example, if the load and add were done within the time limit, the value in the register and thus the value or signature obtained at 704 would be 10. The result of 10 would indicate a pass signature; however, it the value in the register is some other value, i.e., a failure signature, then that would indicate a failure to complete the operation within the time limit.

If a result obtained at 704 does not indicate a pass at 705, then at 706 a fail address is sent to an address decoder to provide an indication that the frequency of operation for the embedded processor was too high. If a result obtained at 704 does indicate a pass at 705, then at 707 a pass address is sent to an address decoder to provide an indication that the frequency of operation for the embedded processor was not too high.

Notably, with speed binning, there are discrete frequencies at which an embedded processor is tested, starting with the highest of these discrete frequencies. However, the above-described flow may be used for speed characterization of the embedded processor. For speed characterization, a lower frequency of operation is a starting point, and the frequency is gradually increased until the embedded processor fails. Accordingly, speed verification includes speed characterization and speed binning.

Notably, during any of 701, 702 or 703, an interrupt may occur. If an interrupt occurs, then at 711 outcome of a test program is indeterminate ("interrupted"). Accordingly, an interrupt address is sent to an address decoder to indicate the interrupt. This interrupt may be caused by an exception generated by abnormal execution of the program.

Additionally, for speed binning embedded processor 120, test instructions may be confined to embedded processor 120, namely, be independent of cycle-to-cycle timing of logic outside of embedded processor 120, to facilitate porting such tests to other embedded processor environments and ensuring validity in such other environments.

Configured Self-Test

Figure 4:
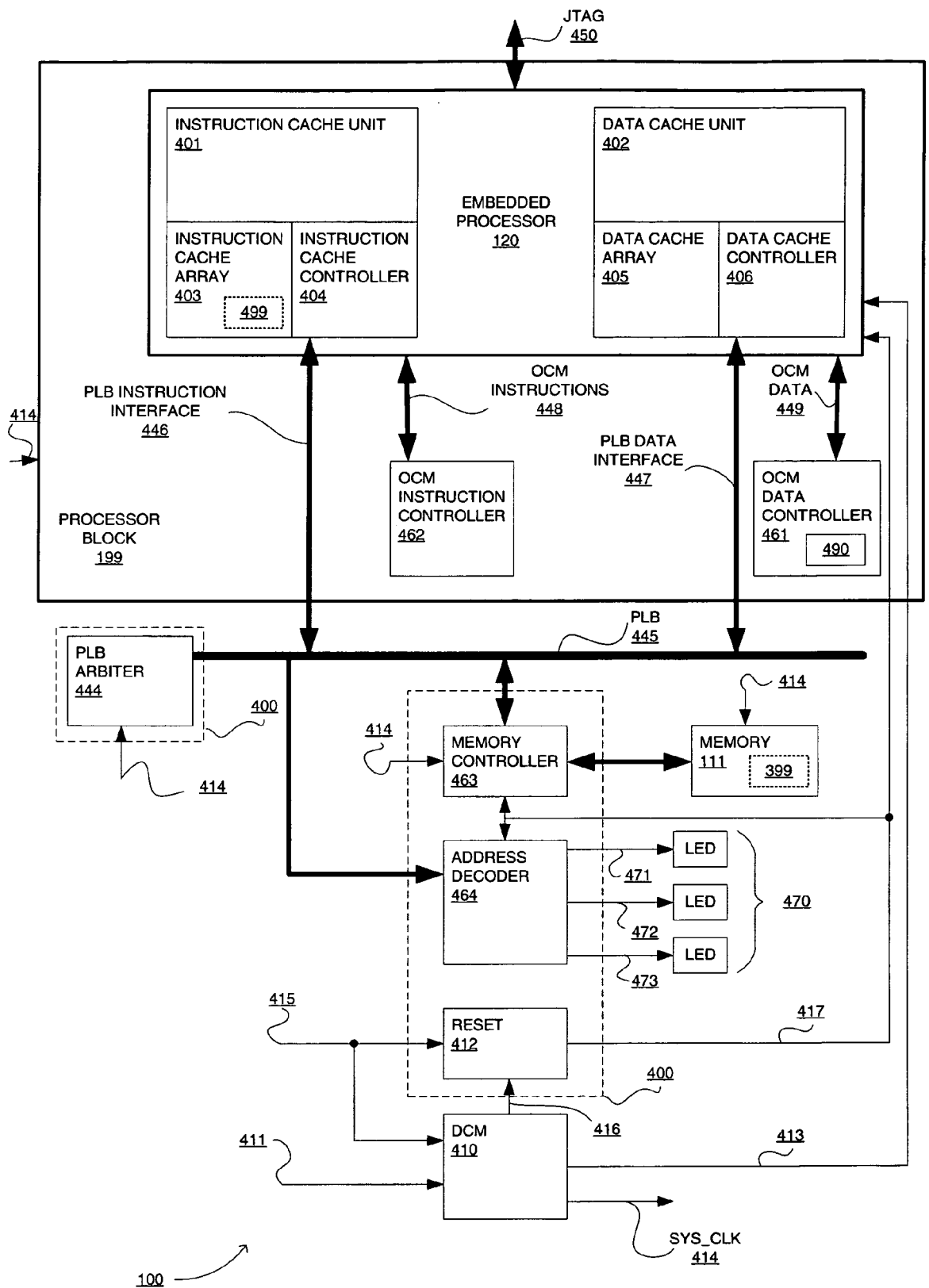
FIG. 4 is a block diagram depicting an exemplary embodiment of an FPGA having configured self-test circuitry.

FIG. 4 is a block diagram depicting an exemplary embodiment of an FPGA having configured self-test circuitry 400. The configured circuitry includes programmable logic (i.e., configurable logic), which can be first programmed or configured to function as test circuitry and then can be re-programmed or re-configured to perform operational, i.e., non-test functions. An oscillator or clock signal 411 is input to a DCM 410 of FPGA 100. An example of a DCM is described in the Virtex-II Pro User Guide (Oct. 14, 2002) from Xilinx Corp. of San Jose, Calif. Clock signal 411 may be provided from tester 202 of FIG. 2. Frequency of clock signal 411 may be substantially slower than frequency of operation of embedded processor 120. For example, frequency of clock signal 411 may be approximately 50 MHz and frequency of operation of embedded processor 120 may range from approximately 350 to 450 MHz. Of course other frequencies may be used. Additionally, embedded processor 120 may have a boundary scan interface, such as Joint Task Action Group ("JTAG") interface 450, as is known.

DCM 410 is configurable to adjust frequency of clock signal 411. Thus, for purposes of speed verification, DCM 410 may be used to increase clock frequency in excess of that available from an external source, such as tester 202 of FIG. 2. Furthermore, using an external clock source, such as a crystal ("XCO"), may not be available if I/Os of FPGA 100 are not capable of operating at an upper limit of operational frequency. Because frequency of clock signal 411 is programmably adjustable by using DCM 410, obtaining operational frequencies using on-chip clock generation is facilitated.

DCM 410 multiplies frequency of clock signal 411 to provide a processor clock signal 413. Additionally, DCM 410 may multiply frequency of clock signal 411 to provide a system clock signal 414. System clock signal 414 may be provided to clocked circuits, such as processor local bus ("PLB") arbiter 444, memory controller 463, processor block 199 and memory 111. Notably, conventionally, operation of PLB 445 is synchronized to operation of processor block 199.

Notably, system clock signal 414 may be of a lesser frequency than processor clock signal 413. It is well known that processors conventionally operate at frequencies higher than their local bus and memory. Thus, DCM 410 may use different multiplication ratios for different clock signal outputs. Accordingly, processor clock signal 413 and system clock signal 414 are obtained from a same source clock signal 411, and thus may be provided to embedded processor 120 and PLB arbiter 444 for synchronous operation. It should be appreciated that FPGA 100, exclusive of embedded processor 120, may operate at a different frequency, namely, in a different clock domain, than a frequency of operation of embedded processor 120. Furthermore, it should be appreciated that a tester may not be able to provide a clock signal with a frequency of operation of an embedded processor 120, and thus DCM 410 may be used to multiply up the frequency of the clock signal provided by the tester to one or more frequencies of operation of embedded processor 120.

A reset signal 415 is provided to reset circuitry 412. A lock signal 416 is provided from DCM 410 to reset circuitry 412. Lock signal 416 indicates when DCM 410 has frequency locked to source clock signal 411.

Embedded processor 120 is held in a reset state via reset signal 417 responsive to reset signal 415. However, once DCM 410 obtains a lock, lock signal 416 provided to reset circuitry 412 releases embedded processor 120 from a reset state via reset signal 417 for operation thereof. In other words, embedded processor 120 may automatically begin executing the determined instructions in instruction cache responsive to being released from the reset state. Reset signal 417 may be provided to memory controller 463, address decoder 464 and embedded processor 120.

Embedded processor 120 is coupled to PLB arbiter 444 via PLB 445. Memory controller 463 is coupled to embedded processor 120 via PLB 445. Memory 111 is coupled to embedded processor 120 via memory controller 463 and PLB 445.

At least one test program 399 is loaded into memory 111, which is block random access memory ("BRAM") of FPGA 100. Notably, if a test program 399 is too large for internal FPGA memory 111, external memory 112 may be used. Test program 399 includes determined assembly language coded instructions for exercising a critical path of embedded processor 120 and includes wrapper code which causes such determined instructions to be loaded from memory 111 into cache memory of embedded processor 120. Cache memory of embedded processor 120 may be divided out into instruction cache and data cache. For example, data cache may include a data cache unit 402, data cache array 405 and data cache controller 406, and instruction cache may include an instruction cache unit 401, instruction cache array 403 and instruction cache controller 404.

Instruction cache controller 404 may be coupled to PLB 445 via PLB instruction interface 446. Data cache controller 406 may be coupled to PLB 445 via PLB data interface 447.

Additionally, for managing data and instruction communications from host FPGA 100 to embedded processor 120, on-chip memory ("OCM") controllers may be used. For example, an OCM instruction controller 462, which is coupled to embedded processor 120, may be used for communication of controller instructions 448, instead of using PLB 445 and instruction cache controller 404, and an OCM data controller 461, which is coupled to embedded processor 120, may be used for communication of controller data 449, instead of using PLB 445 and data cache controller 406.

Notably, embedded processor 120, OCM instruction controller 462, OCM data controller 461, PLB 445, and PLB arbiter 444 are all known, and additional details regarding them may be found in: "DS110: 'Virtex-II Pro™ X Platform FPGAs: Functional Description" Datasheet (v1.1; Mar. 4, 2004) [online] Xilinx, Inc., 2004. Retrieved from the Internet: <URL:http://www.xilinx.com/bvdocs/publications/ds110.pdf>; and "PowerPC 405 Processor Block Reference Guide: Embedded Development Kit" (EDK 6.1 Oct. 6, 2003) [online] Xilinx, Inc. 2003. Retrieved from the Internet: <URL:http://www.xilinx.com/bvdocs/userguides/ppc405block_ref_guide.pdf>.

One or more test programs 399 are provided as processor determined instructions to embedded processor 120 and stored in memory 111, and such one or more test programs 399 may be loaded as part of a configuration bitstream for configuring FPGA 100. Accordingly, as a configuration bitstream is used to initialize FPGA, no extra step is used to configure FPGA 100 with one or more test programs 399. In order to operate embedded processor 120 at a frequency of operation thereof, one or more of sets of determined test instructions 499 from test programs 399 are loaded into embedded processor 120 cache, such as instruction cache array 403. For example, a test program 399 may include a set of determined instructions assembly language instructions and wrapper code. The set of determined instructions 499 is for exercising a path, such as a critical path, for purposes of speed verification. The wrapper code is to cause the set of determined instructions to be loaded into embedded processor 120 cache, and then after execution of the set of determined instruction or a portion thereof, to issue an address signal flag. The set of determined instructions 499 stored in embedded processor 120 cache begins being run by embedded processor 120 responsive to embedded processor 120 being released from a reset state, as previously described.

Notably, to operate embedded processor 120 at a frequency of operation, determined instructions 499 are stored in an instruction cache of embedded processor 120. The amount of memory of instruction cache array 403 is limited, and conventionally insufficient in size to hold all possible determined instruction sequences for testing all circuits of embedded processor 120. Thus, determined instructions 499 may just be for exercising a critical path of embedded processor 120.

An address signal flag is sent from embedded processor 120 to PLB arbiter 444. Three addresses may be loaded into PLB arbiter 444, namely, a pass address, a fail address and an interrupt address, as previously described. These addresses may be loaded into PLB arbiter 444 in response to wrapper code, as previously described.

After completion of executing a set of determined instructions or after being interrupted during the execution of the set of determined instructions for exercising a critical path, embedded processor 120 responsive to wrapper code provides an address flag signal. The address flag signal is provided to PLB arbiter 444 via PLB instruction interface 446. The address flag signal indicates whether embedded processor 120 either passed or failed, or was interrupted during, a speed bin test for example.

Responsive to an address signal flag, PLB arbiter 444 provides one of three addresses to address decoder 454, namely, either a pass address, a fail address or an interrupt address. Address decoder 454 in response to receiving such an address asserts (i.e., driven to an active state) one of three signal, namely, pass signal 471, fail signal 472 and interrupt signal 473.

If pass signal 471 is asserted, then a light emitting diode ("LED") of LEDs 470 associated therewith will illuminate. Notably, LEDs 470 are optional and are not part of FPGA 100. Programmable I/Os may be configured to provide respective output signal paths for signals 471, 472 and 473 as part of configuration of programmed self-test circuitry 400.

It should be appreciated that no extra pins are needed for FPGA 100 self-test circuitry 400. Additionally, the interface between a tester and FPGA 100 is relatively simple, which means that less than full featured test equipment may be used. Moreover, a DUT card or motherboard for testing is simplified.

Self-test circuitry 400 includes address decoder, programmed I/O's for outputting signals 471, 472 and 472, PLB arbiter 444, and reset circuitry 412. Additionally, memory controller 463 may be part of self-test circuitry 400. It should be appreciated that all self-test circuitry 400 programmable resources may be returned to a pool of available resources after testing, and thus there is no lingering overhead with respect to programmable resources post testing. Moreover, all other resources belong to FPGA 100, and thus there is no added permanent overhead in terms of circuitry for self-test as described herein.

Attached hereto and incorporated by reference herein in its entirety is Appendix C, where there is shown a sample of an embodiment of address decoder code for instantiating address decoder 464. Address decoder 464 may be implemented in configurable logic using such Verilog code. Instantiating other circuits in configurable logic may be done with known libraries. For example, memory controller 463 and PLB arbiter 444 may be implemented with a plb_bram_if_cntrlr and a plb_arbiter, respectively, available from Xilinx, Inc. of San Jose, Calif. Additional details regarding these libraries respectively be may be found at: "PLB Block RAM (BRAM) Interface Controller" Datasheet (DS240; v1.2; Nov. 11, 2002) [online] Xilinx, Inc., 2004. Retrieved from the Internet: <URL:http://www.xilinx.com/ipcenter/catalog/logicore/docs/PLB_IPSPEC125.pdf>; and "Processor Local Bus (PLB) Arbiter Design Specification" Datasheet (Feb. 27, 2002) [online] Xilinx, Inc., 2004. Retrieved from the Internet: <URL:http://www.xilinx.com/ipcenter/catalog/logicore/docs/PLB_IPSPEC125.pdf>.

Configuration of an FPGA for Speed Binning

Figure 5:
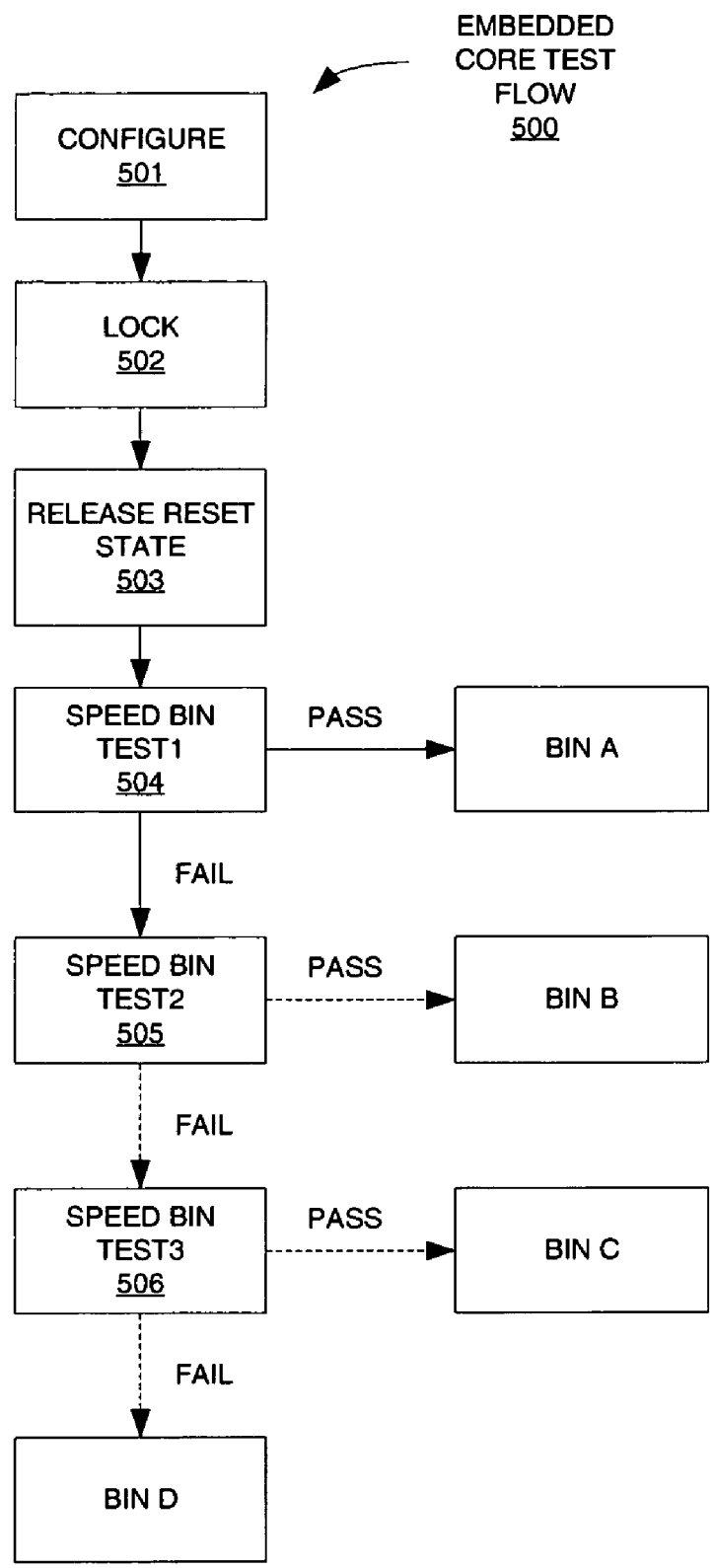
FIG. 5 is a flow diagram depicting an exemplary embodiment of speed binning test flow.

FIG. 5 is a flow diagram depicting an exemplary embodiment of a speed binning test flow 500. With continuing reference to FIG. 5 and renewed reference to FIG. 4, speed binning test flow 500 is described.

At 501, FPGA 100 is configured with a configuration bitstream. Configuration includes instantiating self-test circuitry 400 in configurable logic and causing one or more test programs 399 to be written into memory 111. At 502, DCM 410 locks onto clock signal 411.

At 503, a reset state of processor block 199 is released responsive to DCM 410 locking to clock signal 411. This automatically causes embedded processor 120 to begin executing a test program 399.

At 504, an embedded processor 120 is tested for speed verification as described with reference to FIGS. 3, 6 and 7. Test outcome from 504 may be used to speed bin FPGA 100 with respect to frequency of operation of embedded processor 120. In one aspect of the present invention, the FPGA 100 may be tested at a first speed bin test 504, for example, 450 MHz, and if it passes the test, then the FPGA is placed in a bin, e.g., Bin A, with an identifier indicating 450 MHz. Notably, though an embedded processor 120 is tested for speed verification, other portions of embedded processor block 199 may be tested, including without limitation on-chip memory controllers operating at the same frequency of operation as embedded processor 120.

At 505, an integrated circuit may be optionally further speed binned at a frequency of operation lower than that at 504. For example, there may be discrete values for speed binning, e.g., 450 MHz, 400 MHz and 350 MHz. Continuing the example, if embedded processor 120 passed a 450 MHz test at 504, then the integrated circuit would be placed in Bin A. If embedded processor 120 failed at 450 MHz, but passed at a 400 MHz test at 505, then the integrated circuit would be placed in another bin, e.g., Bin B. If embedded processor 120 failed at 450 MHz and 400 MHz, but passed at a 350 MHz test at 506, then the integrated circuit would be placed in another bin, e.g., Bin C. If embedded processor 120 failed at 450 MHz, 400 MHz and 350 MHz tests at 504, 505, and 506 respectively, then the integrated circuit would be placed in another bin, e.g., Bin D, as a rejected part. Of course, these frequencies are merely illustrative examples and other discrete frequencies may be used for speed binning. Also the number of tests and bins and the order of steps are also illustrative examples and different numbers of tests and bins and step order may be used for speed binning.

Additionally, it should be appreciated that a test program may include instructions for functional testing of an embedded processor block 199, such as for testing OCM instruction controller 462 or OCM data controller 461.

Functional Testing

For a CoreConnect architecture for a PowerPC processor core from IBM, a device control register ("DCR") bus is provided. The DCR bus provides access to components external to the processor core 120. Though not needed for a speed limiting path testing, DCRs may be used to configure processor core 120 to target environmental conditions, such as voltage level.

Figure 8:
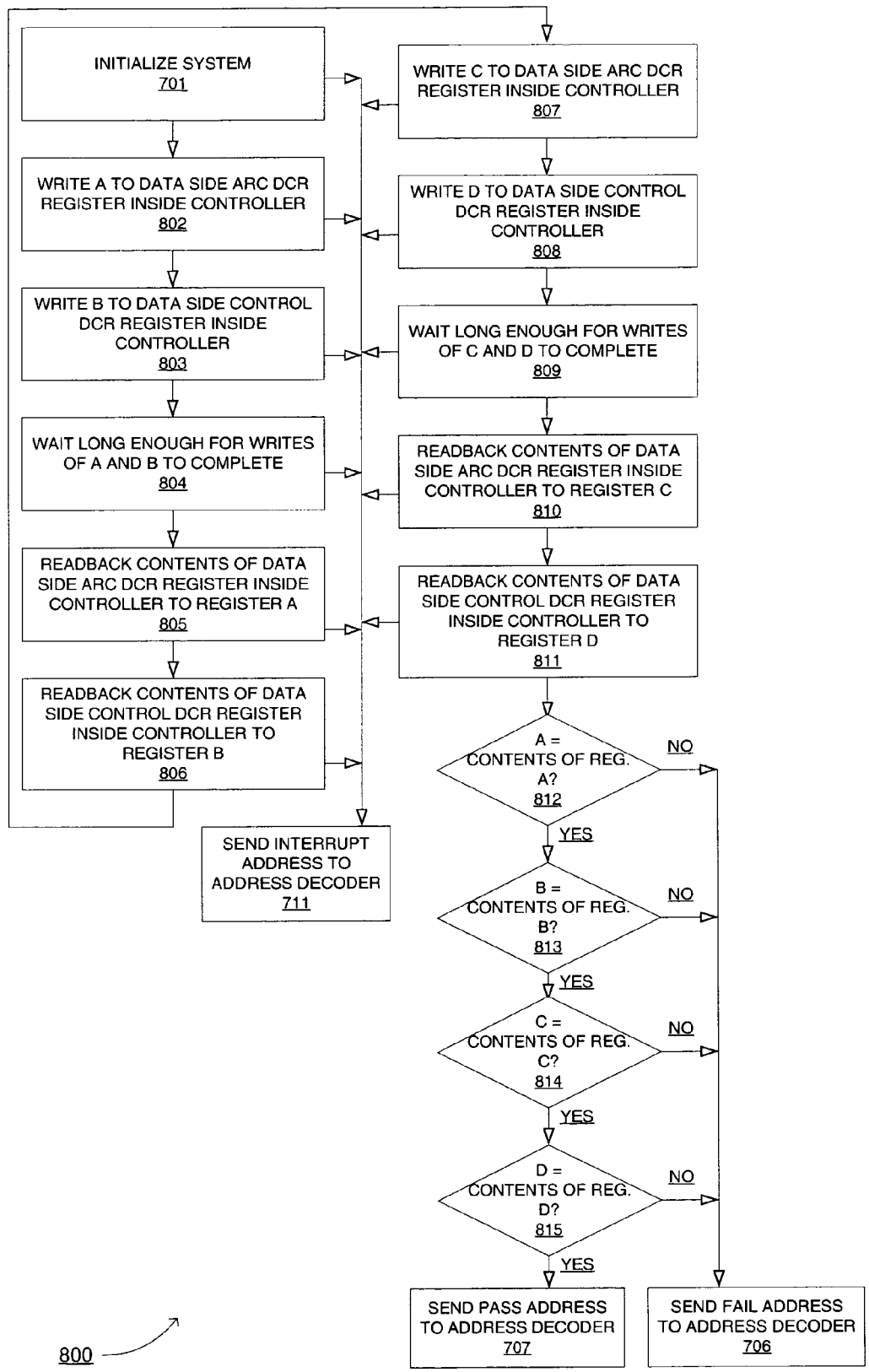
FIG. 8 is a flow diagram depicting an exemplary embodiment of a functional test flow for writing to and reading from DCR registers.

FIG. 8 is a flow diagram depicting an exemplary embodiment of a functional test flow 800 for writing to and reading from DCR registers. With continuing reference to FIG. 8 and renewed reference to FIG. 4, it should be understood that DCR registers 490 may be included in a controller, such as OCM data controller 461.

At 701, a system is initialized, as previously herein described. At 802, a value, "A", is written to a data side ("ARC") DCR register inside a controller, such as a DCR register of DCR registers 490 inside OCM data controller 461. At 803, a value, "B", is written to a data side control DCR register inside a controller, such as a control register of DCR registers 490 inside OCM data controller 461.

At 804, a wait state may be entered for completion of the writes at 802 and 803 for a frequency of operation. In other words, the length of time of the wait state does not ensure that the writes are complete, it merely is to ensure that for circuitry capable of running at the frequency of operation the length of time of the wait state should be sufficient for completion of the writes.

At 805, the value written to the ARC DCR register is readback into a GPR register, e.g., register A. At 806, the value written to the control DCR register is readback into a GPR register, e.g., register B.

At 807, a value, "C" where "C" is not equal to "A", is written to the data side ARC DCR register inside a controller used at 802. At 808, a value, "D" where "D" is not equal to "B", is written to the data side control DCR register used at 803.

At 809, a wait state may be entered for completion of the writes at 807 and 808 for a frequency of operation. In other words, the length of time of the wait state does not ensure that the writes are complete, it merely is to ensure that for circuitry capable of running at the frequency of operation the length of time of the wait state should be sufficient for completion of the writes.

At 810, the value written to the ARC DCR register is readback into a GPR register, e.g., register C. At 811, the value written to the control DCR register is readback into a GPR register, e.g., register D.

At 812, it is determined if the contents of register A equals the value of A. If the contents of register A does not equal A, then a fail address is sent at 706 as previously herein described.

If at 812 it is determined that the contents of register A equals the value of A, then at 813 it is determined if the contents of register B equals the value of B. If the contents of register B does not equal B, then a fail address is sent at 706 as previously herein described.

If at 813 it is determined that the contents of register B equals the value of B, then at 814 it is determined if the contents of register C equals the value of C. If the contents of register C does not equal C, then a fail address is sent at 706 as previously herein described.

If at 814 it is determined that the contents of register C equals the value of C, then at 815 it is determined if the contents of register D equals the value of D. If the contents of register D does not equal D, then a fail address is sent at 706 as previously herein described.

If, however, the contents of register D does equal the value of D, then a pass address is sent at 707 as previously herein described. Furthermore, an interrupt, as previously herein described, may take place during any of operations 802 through 811, and if such an interrupt does take place, an interrupt address is sent at 711 as previously herein described.

Attached hereto and incorporated by reference herein in its entirety is Appendix D, where there is shown a sample of an embodiment of functional test code for write and read testing of DCR registers using self-test circuitry provided with configurable logic as described above.

Attached hereto and incorporated by reference herein in its entirety is Appendix E, where there is shown a sample of another embodiment of functional test code of OCM data controller 461 and OCM instruction controller 462, or more particularly to initialize on-chip memories. OCM data controller 461 and OCM instruction controller 462 may be tested using configured self-test circuitry provided with programmable or configurable logic as described above.

Notably, in addition to using integrated circuit memory, one or more embodiments may be implemented as a program product for use with a computer system such as, for example, the SoC shown in FIG. 1. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable determined instructions that direct the functions of an SoC, represent embodiments of the invention.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, though assembly language code is described herein, other languages directly executable by a processor may be used. Furthermore, code may be written at a higher level and then translated to a language that may be directly executed by a processor. Claim(s) listing steps do not imply any order of the steps. Trademarks are the property of their respective owners. Headings are used herein merely for purposes of convenience and should not be taken in any way to limit the scope of the invention.

What is claimed is:

1. A system for testing an integrated circuit comprising:
an embedded microprocessor located in the integrated circuit, the integrated circuit being a field programmable logic device, the embedded microprocessor being designed apart from the integrated circuit as an embeddable core;
the field programmable logic device including programmable logic capable of being configured as programmable test circuitry;
a plurality of assembly language instructions stored in a memory internal to the integrated circuit, the plurality of assembly language instructions for substantially exercising a critical path or a path close to the critical path in the embedded microprocessor;
the programmable test circuitry comprising a programmable clock circuit for providing a multiplied clock signal to the embedded microprocessor in order to execute the plurality of assembly language instructions;
the programmable clock circuit not being part of the programmable logic but being a digital clock tile of the field programmable logic device, the programmable clock circuit capable of receiving an input clock signal for multiplication to provide the multiplied clock signal for testing of the embedded microprocessor;
the programmable test circuitry including a memory controller and an address decoder both of which are instantiated in the programmable logic responsive to configuring the field programmable logic device for a configured-in self-testing mode;
the programmable clock circuit configured for providing a test system clock signal responsive in part to receiving the input clock signal, the test system clock signal capable of being less in frequency than the multiplied clock signal;
the memory controller and the address decoder coupled to receive the test system clock signal for synchronous operation with the embedded microprocessor, the embedded microprocessor being coupled to the programmable test circuitry via an arbitrated bus;
the programmable test circuitry including a reset circuit coupled to receive a lock signal from the programmable clock circuit and configured to provide a release from reset state signal to the memory controller, the address decoder, and the embedded microprocessor for the synchronous operation thereof.

2. The system of claim 1 wherein the plurality of assembly language instructions are loaded into the memory as part of a test program responsive to the configuring of the field programmable logic device for the configured-in self-testing mode; and wherein the programmable memory controller is used to transfer the plurality of assembly language instructions wrapped in wrapper code from the memory to the embedded microprocessor.

3. The system of claim 1 wherein the plurality of assembly language instructions, when executed by the embedded microprocessor, produces a result within a set time interval.

4. The system of claim 3 wherein the address decoder receives a first address when the result is equal to an expected result and a second address when the result is not equal to the expected result.

5. A method for speed binning an integrated circuit having an embedded processor, the method comprising:
instantiating a configured-in self-test circuit in programmable logic of the integrated circuit;
the instantiating including transferring a set of predetermined assembly language instructions to a memory of the integrated circuit;
communicating the set of predetermined assembly language instructions from the memory to the embedded processor at a first clock rate;
running the set of predetermined assembly language instructions by the embedded processor at a second clock rate to exercise a critical path of the embedded processor; and
obtaining a test result responsive to running the set of assembly language instructions to speed bin the integrated circuit.

6. The method of claim 5, wherein the set of predetermined assembly language instructions are transferred from the memory to a cache of the processor.

7. The method of claim 5, further comprising identifying the programmable logic for return to a pool of available resources of the integrated circuit for subsequent use after the speed binning, wherein no circuitry overhead associated with the speed binning need remain after the speed binning; and wherein the second clock rate is greater than the first clock rate.

8. A system for speed binning an integrated circuit having an embedded processor, the system comprising:
means for instantiating a configured-in self-test circuit in programmable logic of the integrated circuit;
the means for instantiating including means for transferring a set of assembly language instructions to means for storage of the integrated circuit;
means for communicating the set of predetermined assembly language instructions from the storage to the embedded processor at a first clock rate;
means for executing a critical path or near critical path of the embedded processor by using the set of assembly language instructions the means for executing occurring at a second clock rate; and
means for obtaining a test result responsive to running the set of assembly language instructions in order to speed bin the integrated circuit.

9. The system of claim 8, wherein the second clock rate is greater than the first clock rate.

* * * * *